April 21, 1959  C. A. WALDORFF ET AL  2,882,862
TAIL CONE RELEASE AND EJECTION MECHANISM
Filed May 31, 1956

INVENTORS
CHARLES A. WALDORFF
ROBERT E. AINSLIE
BY
*L. W. Smith, Jr.*
ATTORNEYS

2,882,862

TAIL CONE RELEASE AND EJECTION MECHANISM

Charles A. Waldorff, Timonium, Md., and Robert E. Ainslie, Glenside, Pa., assignors to the United States of America as represented by the Secretary of the Navy Application May 31, 1956, Serial No. 588,582

1 Claim. (Cl. 121—40)

(Granted under Title 35, U.S. Code (1952), sec. 266)

The invention described herein may be used by or for the Government of the United States of America for governmental purposes without the payment of any royalties thereon or therefor.

The present invention relates to an ejection mechanism and more particularly to an ejection mechanism in which the structure to be ejected is sequentially released and positively sprung from its normal position.

In some airborne devices discharging explosives or equipment in flight, the tail cone must be released initially in flight to permit dispensing of the contents enclosed therein. One ejection device presently in use utilizes shear pins to support the tail cone in place and an ejector gun to blow the tail cone from the container, thereby causing the shear pins to shear off, permitting the release of the former.

The main disadvantage of the arrangement just described is that the shear pins are subject to vibrational wear which decreases their strength and reliability. Because of this condition the shear pin arrangement for disengaging the tail cone in flight is not desirable.

The present invention provides for the assembly of the tail cone in position with positive structural members strong enough to resist vibrational wear. The inventive ejector mechanism consists of a compact unit which first releases the tail cone and then positively ejects the tail cone away from the container supporting it in flight.

An object of the present invention is the provision of a compact unit capable of insuring the positive release of a member without requiring destruction of the latching elements.

Another object is to provide an arrangement for insuring the positive release of a tail cone from its adjoining container without the use of structurally weak members.

A further object of the invention is the provision of an ejector mechanism which acts to deliver a releasing force and a positive ejection force, sequentially.

A final object of the invention is a compact, positive acting device for separating an airborne container from its tail cone in order to permit discharge of the former's contents.

The exact nature of this invention as well as other objects and advantages thereof will be readily apparent from consideration of the following specification relating to the annexed drawing in which.

Figure 2:
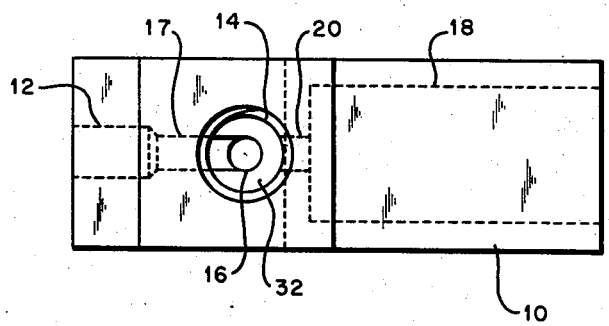
Fig. 2 shows a plan view of the body member of the ejector mechanism.

The ejector mechanism consists of a metal block 10 having drilled therein a plurality of holes and ports including inlet port 12 and release port 14. Release port 14 is threaded at its upper portion to accommodate a threaded bolt 15. A narrow port 16 connects port 14 at its bottom end thereof. Inlet port 12 opens into release port 14 through passageway 17 at the point joining ports 14 and 16. An ejector port 18 opens into port 14 through a narrow passageway 20.

Figure 1:
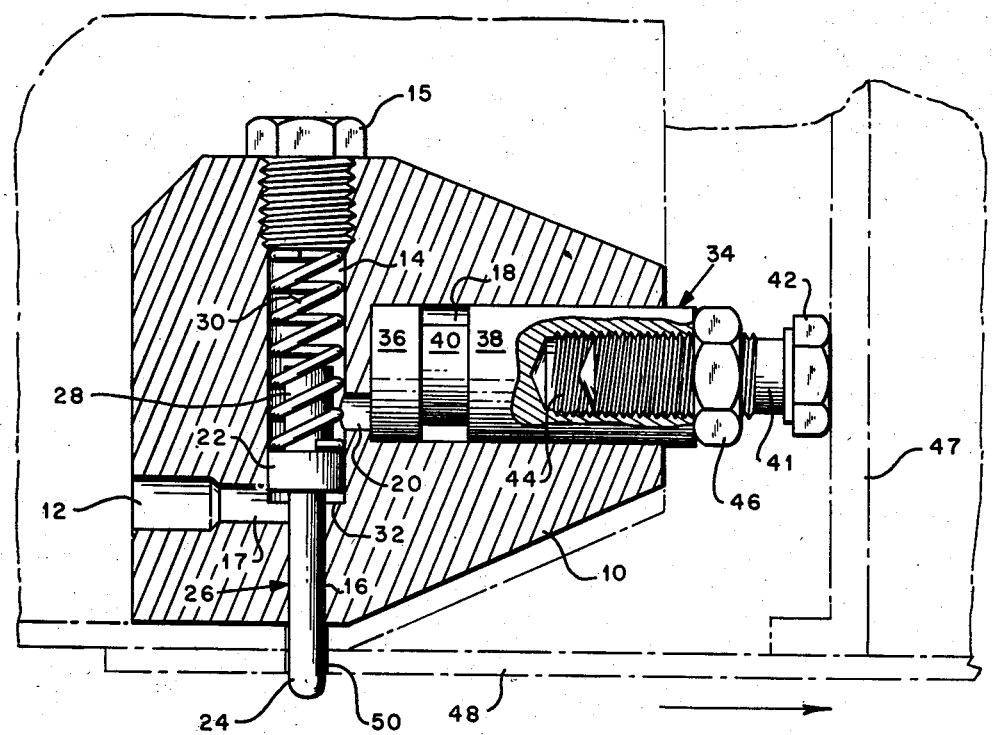
Fig. 1 shows a side sectional view of the mechanism with the tail cone to be ejected shown in phantom.

Within port 14 is placed a release piston member 26 which consists of an extension 24 in opening 16, a piston portion 22 fitted closely within hole 14, and a spring mounting support 28. A spring 30 is mounted between the bottom of threaded bolt 15 and the peripheral surface of piston portion 22 surrounding spring support 28. Bolt 15 may be used to adjust the compression of spring 30. Spring 30 abutting against threaded bolt 15 biases release piston portion 22 against shoulder 32 at the point where release hole 16 meets with port 14. Passageway 17 between port 12 and opening 14 opens into the underside of piston portion 22, as is apparent from Fig. 1.

Within ejector port 18 is located a movable ejector piston 34 having an end portion 36 and a main section 38 joined a narrower section 40, section 36 fitting very closely within ejector port 18. A threaded bolt 41, having a head 42 is threaded into tapped hole 44 located within ejector piston 34. A threaded nut 46 permits the locking of bolt 41 in any desired position, thereby providing an adjustment of said bolt 41. Shown in phantom schematically is a bracket 47 in contact with head 42 and mounted on the surface of tail cone 48, which is to be ejected in the direction of the arrow. Tail cone 48 is provided with an opening 50 for extension 24. One or more additional ejector mechanisms with extensions may be located along the periphery of tail cone 48 for simultaneous ejection, since extensions 24 act to support tail cone 48 in place.

The device functions in the following manner to release and positively eject tail cone 48:

At the instant it is desired to release and eject tail cone 48, a source of high pressure fluid (not illustrated) is released by the usual means into port 12 where it acts on the under side of release piston portion 22 through narrow opening 17. The pressure of the fluid flowing into port 12 is sufficiently high to overcome the force exerted by spring 30 in maintaining piston portion 22 against shoulder 32. Piston portion 22 is thereby moved upwardly in the direction of compressing spring 30, and in so doing, withdraws extension 24 from hole 50. This releases tail cone 48 from rigid support against its frame (not illustrated.) The pressure of the released high pressure fluid continues to move piston portion 22 in an upward direction against spring 30, and uncovers opening 20, thereby releasing the high pressure gas flowing through port 12 against the face of ejector piston 34. The movement of ejector piston 34 under the influence of the fluid pressure in passageway 20 acts to shove tail cone 48 outwardly, thereby positively springing the latter away from the container or structure supporting said tail cone. Bolt head 42 is initially positioned in contact with member 47 and transmits the motion of ejection piston 34 directly thereto. By virtue of the threaded section of bolt 40 and tap hole 44 provided in ejector piston 34, threaded bolt 41 with head 42 may be adjusted for contact with member 46 when tail cone 48 is in place. This arrangement permits a certain amount of flexibility and adjustment in place. Of course, as already mentioned, more than one of these ejection units may be utilized to eject a tail cone or any other member desired to eject. The units may be utilized to act coincidentally against the member to be ejected or they may be arranged for sequential operation when it is desired to release a member in a certain designated direction or manner.

It is seen that there has been provided a novel device for causing the release and positive ejection of a member without sacrificing the rigidity of the connection joining the member and its supporting container or device. In addition, it is seen that the arrangement just described provides that all of the ejection force will be utilized to spring the member rather than utilizing a portion of the ejection force for first destroying the connecting links. It is further apparent that the ejection mechanism described hereinabove will insure that the ejected member will be sprung completely clear of the supporting apparatus or container. This latter feature is very important where the ejected member is sprung from an aircraft and it is most desirable to prevent the ejected member from colliding with any other portion of the aircraft or container in flight.

Obviously many modifications and variations of the present invention are possible in the light of the above teachings. It is, therefore, to be understood that within the scope of the appended claim the invention may be practiced otherwise than as specifically described.

What is claimed is:

Releasable apparatus for fixedly interconnecting first and second members slidably interfitted in a given predetermined direction selectively operable to sequentially disconnect and forcibly disengage the first and second members, said apparatus comprising a unitary body member fixedly secured to the first member, an elongated ejector piston disposed in the given direction and mounted slidably within and projecting from a first elongated chamber in said body member, an ejector means supported by and adjustable longitudinally of said ejector piston for initial driving engagement with said second member, locking means operable to secure said ejector means in fixed relation to said ejector piston, an elongated latch means disposed transversely of said given direction and mounted slidably within and projecting from a second elongated chamber in said body member, said latch means including a latch portion of a predetermined length projecting from said body member and into engagement with a coacting aperture in the second member and an intermediate radially enlarged piston portion with a working face adjoining said latch portion, biasing means interposed between said piston portion and the inner end of said second chamber to normally bias said latch portion into engagement with the aperture in the second member, stop means limiting the displacement of said latch means relative to said body member, a high pressure inlet port in said body member connecting with said second chamber in front of the working face of said piston portion, and a passage through said body member interconnecting the inner end of said first chamber and a point in said second chamber spaced behind the normal position of the working face of the piston portion a distance greater than the length of the latch portion normally in engagement with the aperture in said second member, whereby high pressure fluid admitted through said inlet port first acts upon said piston portion to overcome said biasing means and thereby completely withdraw said latch portion of said latch means from engagement with the second member, and thereafter drives said ejector piston and said ejector means fixedly secured thereto against the second member to forcibly disengage the first and second members.

References Cited in the file of this patent

UNITED STATES PATENTS

| | | |
|---|---|---|
| 459,212 | Brockway | Sept. 8, 1891 |
| 868,946 | Smulders | Oct. 22, 1907 |
| 1,002,028 | Brown | Aug. 29, 1911 |
| 1,709,000 | Bolens | Apr. 16, 1929 |
| 2,196,946 | Stone | Apr. 9, 1940 |
| 2,342,812 | Martinson | Feb. 29, 1944 |
| 2,507,628 | Gaines | May 16, 1950 |